No. 661,529. Patented Nov. 13, 1900.
A. G. HOHENSTEIN.
STEAM BOILER.
(Application filed Feb. 16, 1900.)

(No Model.) 5 Sheets—Sheet 1.

WITNESSES:
Herbert Bradley.
F. E. Gaither.

INVENTOR
Archie G. Hohenstein
by Dennis S. Wolcott Att'y.

No. 661,529. Patented Nov. 13, 1900.
A. G. HOHENSTEIN.
STEAM BOILER.
(Application filed Feb. 16, 1900.)

(No Model.) 5 Sheets—Sheet 3.

WITNESSES: INVENTOR

No. 661,529. Patented Nov. 13, 1900.
A. G. HOHENSTEIN.
STEAM BOILER.
(Application filed Feb. 16, 1900.)

(No Model.) 5 Sheets—Sheet 4.

WITNESSES: INVENTOR
Herbert Bradley Archie G. Hohenstein
F. E. Gaither by Dennis S. Wolcott Att'y.

No. 661,529. Patented Nov. 13, 1900.
A. G. HOHENSTEIN.
STEAM BOILER.
(Application filed Feb. 16, 1900.)

(No Model.) 5 Sheets—Sheet 5.

WITNESSES:
Herbert Bradley
F. E. Gaither

INVENTOR
Archie G. Hohenstein
by Darwin S. Wolcott Att'y.

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 661,529, dated November 13, 1900.

Application filed February 16, 1900. Serial No. 5,437. (No model.)

*To all whom it may concern:*

Be it known that I, ARCHIE G. HOHENSTEIN, a citizen of the United States, residing at New Haven, in the county of New Haven and State of Connecticut, have invented or discovered certain new and useful Improvements in Steam-Boilers, of which improvements the following is a specification.

In an application, Serial No. 698,966, filed December 12, 1898, I have described and claimed certain improvements in water-tube boilers, said improvements consisting, generally stated, in a construction wherein the main heating-surface is formed by two or more inclined sets or banks of tubes oppositely arranged, each bank or set extending once across the combustion-chamber. This arrangement of tubes is combined with a steam-drum, downtakes, and mud-drum in such manner as to insure a constant circulation of water in the same direction. It is characteristic of the construction set forth in said application that the circulation starts from an initial point—*i. e.*, where the water enters the boiler—and proceeds, by two paths or sets of paths independent of but parallel or substantially parallel with each other, to a common chamber at or near the top of the boiler, from whence the circulation proceeds by common paths to the initial point.

The invention described herein has for one object a construction which, while preserving the advantageous features as regards continuous circulation in the same direction, provides for such circulation entirely within the combustion-chamber and above the grate-surface.

A further object of the invention is to extend the sectional character of this class of boiler to substantially all parts thereof which may need renewal or repair and to render such parts easily accessible for such repair or renewal.

Figure 1:
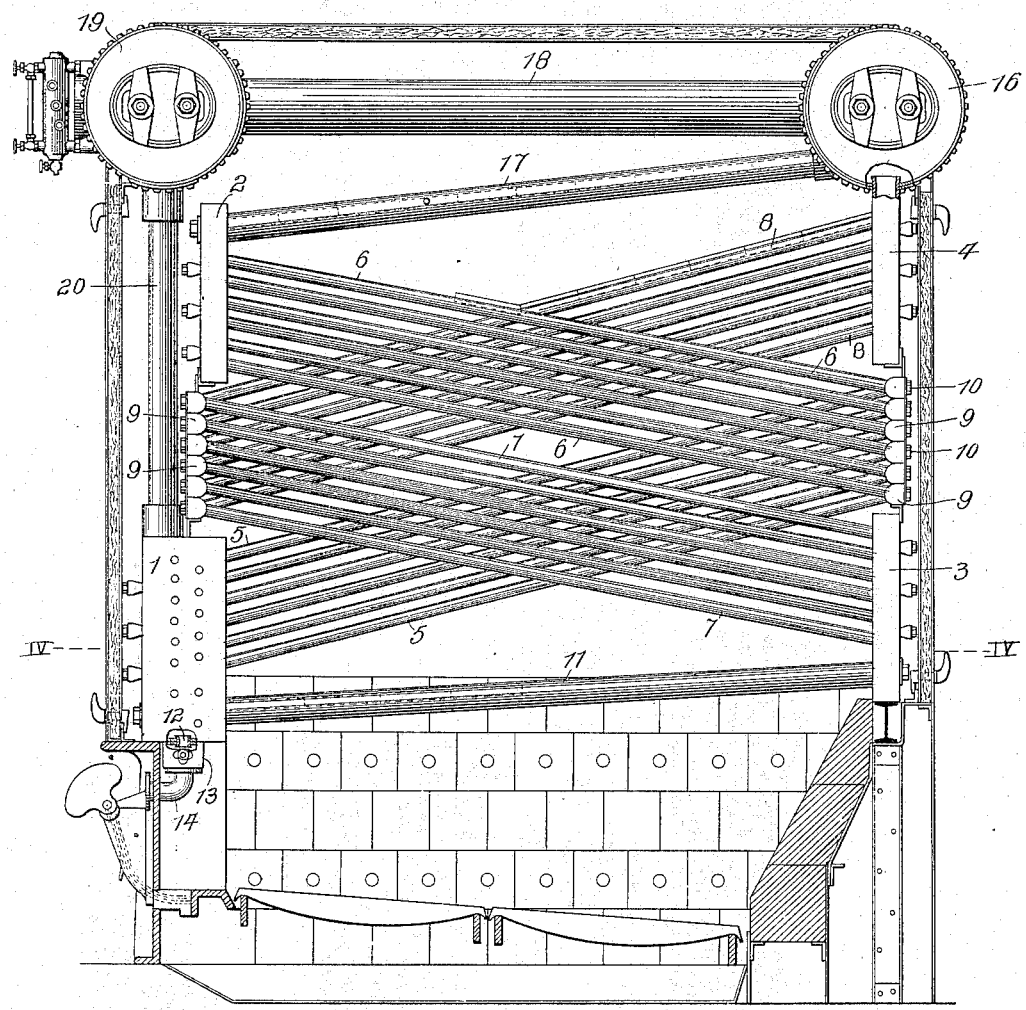
Figure 2:
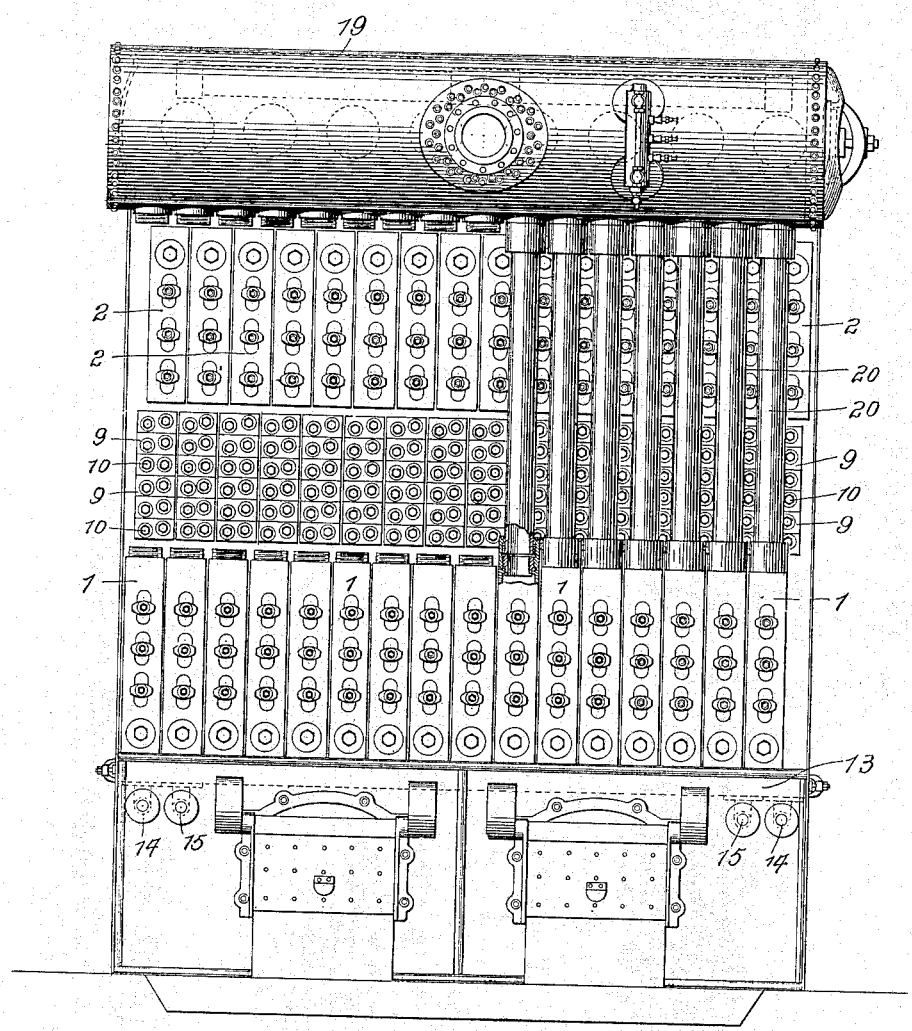
Figure 3:
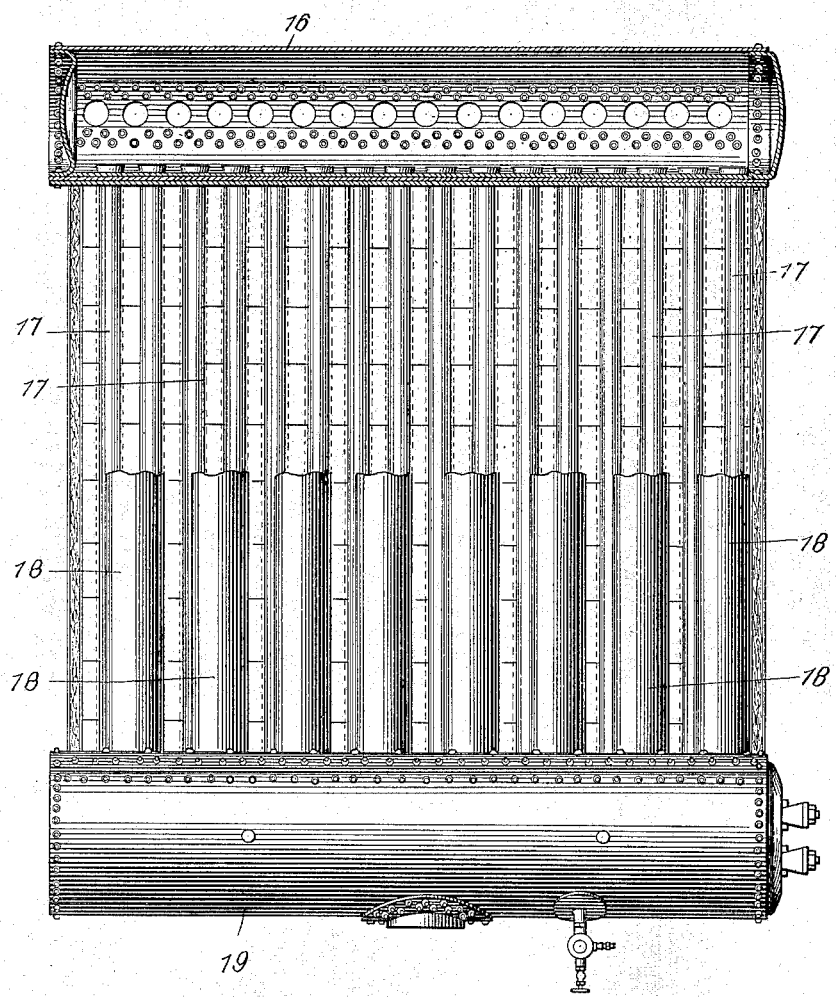
Figure 4:
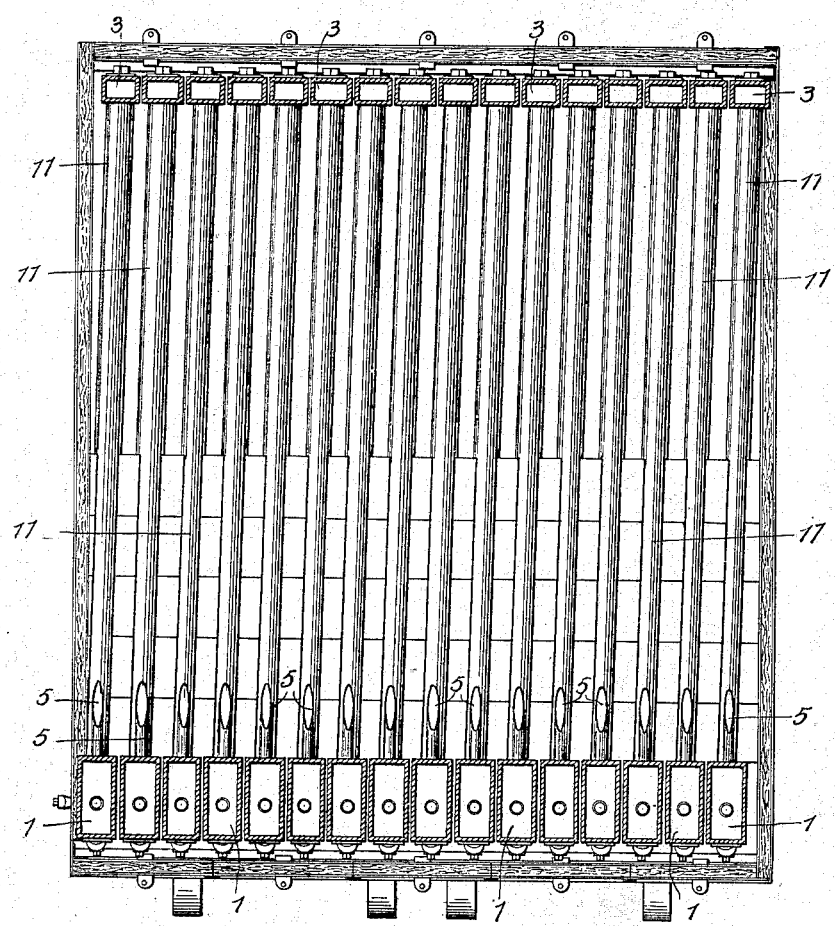
Figure 5:
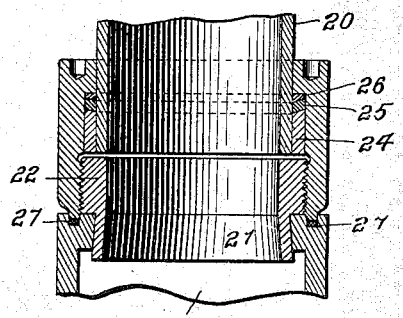
Figure 6:
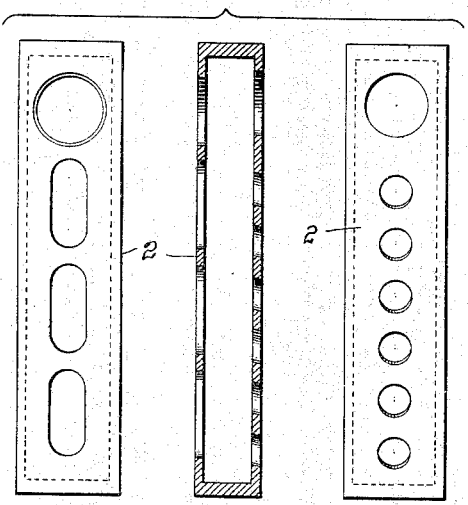
Figure 7:
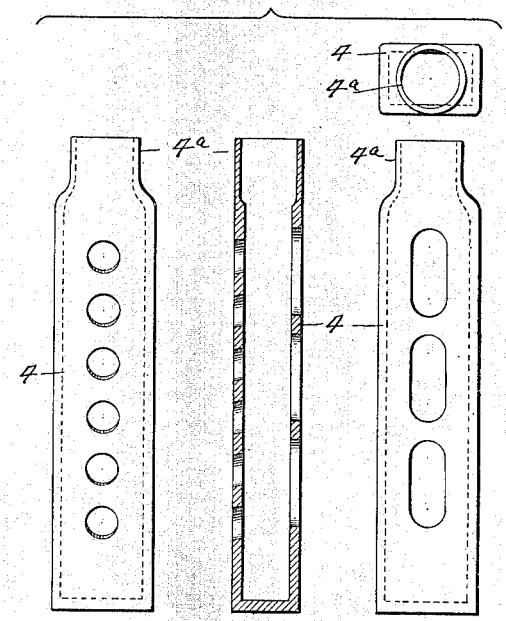
Figure 8:
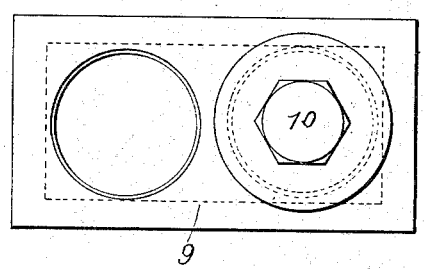
Figure 9:
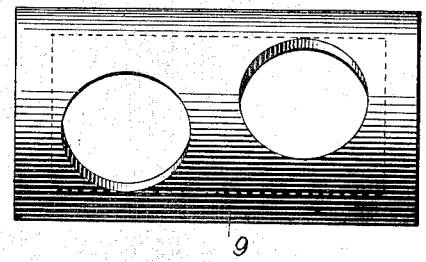
Figure 10:
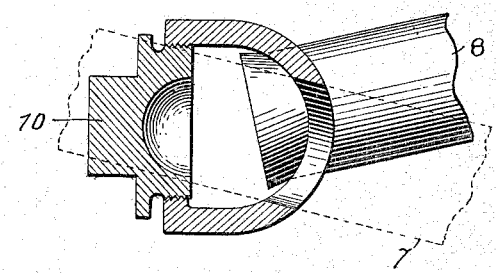

In the accompanying drawings, forming a part of this specification, Figure 1 is a sectional elevation of my improved boiler. Fig. 2 is a front elevation of the same, a portion of the downtakes being removed. Fig. 3 is a view, partly in plan and partly in sectional plan, of the boiler. Fig. 4 is a sectional plan view, the plane of section being indicated by the line IV IV, Fig. 1. Fig. 5 is a sectional view, on an enlarged scale, illustrating the manner of connecting the downtakes to the upper drum and lower front headers. Fig. 6 illustrates in front sectional and rear elevation the construction of the upper front or lower rear header. Fig. 7 illustrates in front sectional rear elevation and plan the upper rear header. Figs. 8 and 9 are front and rear elevations of a return-bend for the tubes, and Fig. 10 is a sectional view of the same.

My improved boiler consists of a series of lower front headers 1, each header being connected by two banks or sets of tubes to one of a like series of upper front headers 2, and a series of lower rear headers 3, similarly connected by two banks or sets of tubes to the series of upper rear headers 4. Each of the banks or sets forming the connection between the pairs of front headers 1 and 2 consists of a series of tubes 5, the number of such tubes being dependent on the height of the boiler, connected at the rear of the boiler to a like number of tubes 6, forming the upper banks or sets of the connection between the front headers. The lower banks or sets extending up from the lower rear headers 3 to points between the front headers are formed by a series of tubes 7, which are connected at the front of the furnace to a like series of tubes 8, having their rear ends connected to the upper rear headers 4. It will be observed that the upper headers 2 and 4 are arranged directly above the lower headers, and the tubes forming the several banks or sets extend from their respective headers across the boiler to points between the headers on the opposite side. By reason of this construction all the tubes are of the same length, thus rendering renewals thereof easy and avoiding the necessity of keeping different sizes of tubes in stock. The tubes of each lower bank are individually connected to the corresponding tubes of the complementary bank by shells or boxes 9, known in the art as "return-bends," thereby forming pairs of tubes, one member of each pair forming a part of a lower bank and the other member forming a part of the complementary bank. Each of the connecting boxes or shells is provided on its inner face with two openings for the reception of the ends of tubes, one in a lower bank and the other the complementary upper bank, the axes of the holes or openings being at an angle to each other corresponding to the angular relation of the tubes to be connected. Threaded openings are formed in the outer face of each shell directly opposite those in the inner face, said openings being so located and having such dimensions as will permit of tubes being drawn out and passed in through the shell or box, as shown in Figs. 8, 9, and 10. The threaded openings in the outer faces of the boxes are closed by threaded plugs 10.

As it is undesirable that the comparatively light tubes forming the lower banks should receive the direct impact of the gases, a series of larger tubes 11 are arranged below the banks of tubes, as shown in Fig. 1. One of these tubes extends with an upward inclination from each of the lower front headers to the opposite rear header. As these tubes form part of the circulating system and supply the lower rear headers, each tube should have a carrying capacity at least equal to that of the bank of tubes extending from the header to which it is connected in order that all the tubes of the bank may have a full supply of water, and the rear headers should have at least an equal carrying capacity.

The lower front headers are connected by thimbles 12 to the water-box 13, extending along the front of the boiler below the front lower headers, as shown in Figs. 1 and 2. As this water-box forms the lowest part of the boiler, the supply-pipe 14 and blow-off pipes 15 are preferably connected thereto.

As shown in Figs. 1 and 7, the upper rear headers 4 are connected to the rear drum 16 by expanding the necks or collars 4ª on the upper ends of the headers into suitable openings in the under side of the drum. In order that this drum may form the meeting-point of the two circulating systems, it is connected by a series of tubes 17 to the upper front headers 2. These headers and the tubes 17, extending therefrom to the drum, should have a carrying capacity at least equal to the carrying capacity of the banks of tubes connected to such headers, and the drum should have a capacity considerably in excess of the combined delivering capacity of the tubes 17 and the upper rear headers 4, so as to form a steam-breaking space.

The drum 16 is connected by a series of horizontal tubes 18 to the front drum 19, which has a capacity equal or approximately equal to that of the rear drum, so as to provide a second steam-breaking chamber. The tubes 18 are made with a carrying capacity in excess of the combined delivering capacities of the tubes 17 and headers 4, thereby providing additional steam-breaking spaces and also a passage for the flow of steam from one drum to the other.

The circulating system is continued from the front drum 19 by a series of downtake-pipes 20, connecting said drum with each of the lower front headers 1. Each of these downtake-pipes is made with a capacity at least equal to the combined carrying capacities of the tubes discharging from the header to which such tube is connected—i. e., the bank of tubes 5 and the tube 11. It will be observed that as the downtake-pipes are arranged in front of the front upper headers and the return-bends of the banks of tubes 7 and 8 one or more of said pipes must be removed in order to renew any of the tubes of the several banks except the lower bank 5, connected to the lower front headers. Hence the downtake-pipes should be so connected to the drum 19 and the headers 1 as to permit of their easy removal. A desirable form of coupling for this purpose is shown in Figs. 2 and 5 and consists of a thimble 21, expanded into an opening in the upper end of the header 1 and provided with an externally-threaded head or enlargement 22, adapted to engage the internally-threaded sleeve 23 on the pipe 20. The pipe 20 is provided at its end with a collar 24, shrunk or otherwise secured on the end of the pipe after the sleeve has been slipped thereon. This collar forms a shoulder with which an inwardly-projecting flange on the sleeve engages. A resilient or yielding packing consisting of a ring 25 of asbestos and a metal ring 26 is interposed between the shoulder 24 on the pipe and the flange on the sleeve. An additional packing is formed by a metal ring 27, arranged in an annular recess in the end of the header and forming a bearing for the end of the sleeve. In making the connection the resilient packing is first compressed and by reason of its resilience permits the end of the sleeve to have a good bearing on the metal ring 27. It will be observed that a packed joint is formed on each side of the threaded connection and that such threaded connection is not depended upon for making a tight joint or coupling between the pipe and the coupling. The upper end of the downtake-pipe is connected by a similar coupling to the front drum 19. In order to provide for expansion and contraction, the downtake-pipes are made of such a length and the couplings at the ends are so constructed that there will be sufficient spaces between the ends of the pipes and the thimbles to permit of expansion and contraction, which will not affect the packed joints at the inner ends of the sleeves, as the resilient packing will maintain a tight joint under all conditions.

The lower front headers 1 may properly be considered the initial points of the circulation, as the water is fed into the boiler through these headers and as the tubes 11 and the banks 5 and 7 are subjected to heat prior to other parts of the boiler and to a higher heat. Starting from these front lower headers, from which water is drawn by heat applied to the tubes 11 and the bank of tubes 5, the water will move in substantially parallel paths through the tubes 11 and the bank of tubes 5 to the lower rear header 3 and the bank of tubes 6, respectively. Thence one current flows through these headers and the bank of tubes 7 and the other current through the bank of tubes 6, the two currents still preserving substantial parallelism. From the bank of tubes 6 one current flows through the upper front headers 2 and tubes 17 to the drum 16, and the other current flows substantially parallel with the first through the bank of tubes 8 and upper rear headers 4 to the same drum. The united currents flow from the drum 16 through the tubes 18 to the front drum 19, and thence through the downtake-pipes 20 to the lower front headers. It is characteristic of my improved boiler that two paths or systems of paths of circulation are established and that such systems of paths, while independent of each other, maintain substantial parallelism with each other while passing back and forth across the combustion-chamber from the starting-point to the point of reunion or common return.

It is further characteristic of my improved construction that there is not any restriction of the circulation at any point and that the supply for any bank or set of tubes is fully equal to the carrying capacity of such bank or set of tubes, thereby avoiding the emptying of any of the tubes of the boiler by a siphoning action.

It will be observed that the upper front headers 2 and lower rear headers 3 are similar in construction and may be substituted one for the other.

I claim herein as my invention—

1. A boiler having in combination a series of upper and a series of lower front headers, a series of two or more banks or sets of connected tubes extending from each series of headers in converging planes to the rear side of the boiler, a series of upper and a series of lower rear headers, a series of two banks or sets of connected tubes extending from the upper and lower headers in converging planes to the front side of the boiler, and a series of tubes intermediate of the banks of cross-tubes and the combustion-chamber connecting the lower front and rear headers, substantially as set forth.

2. A boiler having in combination a series of upper and a series of lower front headers, a series of two or more banks or sets of connected tubes extending from each series of headers in converging planes to the rear side of the boiler, a series of upper and a series of lower rear headers, a series of two banks or sets of connected tubes extending from the upper and lower headers in converging planes to the front side of the boiler, a drum connected to the series of upper rear headers, and a series of tubes extending from the upper front headers to said drum, substantially as set forth.

3. A boiler having in combination a series of upper and a series of lower front headers, a series of two or more banks or sets of connected tubes extending from each series of headers to the rear side of the boiler, a series of upper and a series of lower rear headers, a series of two or more banks or sets of connected tubes extending from the upper and lower headers in converging planes to the front side of the boiler, a drum connected to the upper rear headers, a series of tubes extending from the front upper header to said drum, a drum arranged across the front of the boiler, a series of tubes connecting the front and rear drums, and a series of downtake-pipes connecting the front drum to the lower rear headers, substantially as set forth.

4. A boiler having in combination a series of upper front headers, a series of lower front headers, a series of upper rear headers, a series of lower rear headers, tubes extending across the combustion-chamber connecting the front and rear headers, and a drum having independent connections to the upper and lower headers, substantially as set forth.

5. A boiler having in combination, a series of upper front headers, a series of lower front headers, a series of upper rear headers, a series of lower rear headers, tubes extending across the combustion-chamber connecting the front and rear headers, drums connected to the upper headers, and connections independent of the upper headers from the drums to the lower headers, substantially as set forth.

6. A boiler having in combination a series of upper and a series of lower front headers, a series of two or more banks or sets of connected tubes extending from each series of headers in converging planes to the opposite sides of the boiler, a series of upper and a series of lower rear headers, a series of two or more banks or sets of connected tubes extending from the upper and lower headers in converging planes to the front side of the boiler, the front headers and their connecting-tubes forming one system of circulation and the rear headers and their tubes forming another system of circulation, a series of tubes intermediate of the banks of cross-tubes and the combustion-chamber and connecting the two systems of circulation, substantially as set forth.

7. A boiler having in combination a series of upper and a series of lower front headers, a series of two or more banks or sets of connected tubes extending from these series of headers in converging planes to the rear side of the boiler, a series of upper and a series of lower rear headers, a series of two or more banks or sets of connected tubes extending from the upper and lower rear headers in converging planes to the front side of the boiler, the front headers and their connecting-tubes forming one system of circulation and the rear headers and their connecting-tubes forming another system of circulation and a drum connected to the upper portions of the two systems of circulation, substantially as set forth.

In testimony whereof I have hereunto set my hand.

ARCHIE G. HOHENSTEIN.

Witnesses:
DARWIN S. WOLCOTT,
F. E. GAITHER.